United States Patent
Kusters et al.

(10) Patent No.: US 6,681,310 B1
(45) Date of Patent: Jan. 20, 2004

(54) STORAGE MANAGEMENT SYSTEM HAVING COMMON VOLUME MANAGER

(75) Inventors: Norbert P. Kusters, Woodinville, WA (US); Catharine van Ingen, Berkeley, CA (US); Luis Felipe Cabrera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/449,577

(22) Filed: Nov. 29, 1999

(51) Int. Cl.⁷ .............................................. G06F 17/30
(52) U.S. Cl. ..................... 711/202; 711/111; 711/112; 711/114; 711/137; 711/162; 711/170; 711/209; 707/102; 707/204
(58) Field of Search .............................. 711/4, 111, 112, 711/114, 170, 137, 162; 707/200–205, 102, 104; 714/5, 4; 709/217; 710/38

(56) References Cited

U.S. PATENT DOCUMENTS

| | | | | |
|---|---|---|---|---|
| 5,897,661 A | * | 4/1999 | Baranovsky et al. | 707/205 |
| 5,940,849 A | | 8/1999 | Koyama | 711/4 |
| 5,964,886 A | | 10/1999 | Slaughter et al. | 714/4 |
| 6,032,137 A | * | 2/2000 | Ballard | 705/75 |
| 6,279,033 B1 | * | 8/2001 | Selvarajan et al. | 709/217 |
| 6,282,602 B1 | * | 8/2001 | Blumenau et al. | 711/111 |
| 6,314,503 B1 | * | 11/2001 | D'Errico et al. | 711/153 |
| 6,329,985 B1 | * | 12/2001 | Tamer et al. | 345/532 |
| 6,385,706 B1 | * | 5/2002 | Ofek et al. | 707/204 |
| 6,438,744 B2 | * | 8/2002 | Toutonghi et al. | 717/137 |
| 6,453,426 B1 | * | 9/2002 | Gamache et al. | 714/4 |
| 6,457,139 B1 | * | 9/2002 | D'Errico et al. | 714/5 |

FOREIGN PATENT DOCUMENTS

EP        0 482 853 A        4/1992

OTHER PUBLICATIONS

Gelb J P: "System–managed Storage" IBM systems journal, IBM Corp. Armonk, NY, US, vol. 28, No. 1, 1989, pp. 77–103.*

VERITAS Software Corporation: "VERITAS Volume Manager—Getting Started Guide—Release 3.0.1".

A.L. Buck et al., "The Storage Server as Virtual Volume Manager", Proceedings Twelfth IEEE Symposium on Mass Storage Systems.

"XFS: A Next Generation Journalled 64–Bit Filesystem With Guaranteed Rate I/O", http://www–europe.sqi.com/Technology/xfs–whitepaper.html, Silicon Graphics—XFS White Paper, 1–20, (Mar. 15, 1999).

* cited by examiner

Primary Examiner—T. V. Nguyen
(74) Attorney, Agent, or Firm—Merchant & Gould P.C.

(57) ABSTRACT

A storage management system in which a plurality of volume providers maps logical storage volumes onto one or more storage devices within a stand-alone computer or within a storage network. A common volume manager executing on a computer within the storage network selectively communicates commands to one or more of the volume providers in order to control the storage devices. The inventive storage management system seamlessly integrates management of the vendor-specific volume providers. The common volume manager provides a common application programming interface (API) by which applications are able to control and monitor hardware and software volume providers without requiring detailed knowledge of the volume providers or the underlying storage devices. The common volume manager aggregates response information from the volume providers and communicates the aggregated information to the software application that issued the storage management request. The interface is extensible so as to support provider-specific storage management requests and conforms to a component object-model (COM) interface.

27 Claims, 4 Drawing Sheets

STORAGE MANAGEMENT SYSTEM HAVING COMMON VOLUME MANAGER

RELATED APPLICATIONS

This application is related to the following applications, all of which are filed on the same day and assigned to the same assignee as the present application:

"Quorum Resource Arbitrator Within A Storage Network"—Ser. No. 09/449,579, filed Nov. 29, 1999, "Storage Management System Having Abstracted Volume Providers"—Ser. No. 09/450,364, filed Nov. 29, 1999, "Volume Stacking Model"—Ser. No. 09/451,219, filed Nov. 29, 1999, "Volume Configuration Data Administration"—Ser. No. 09/450,300, filed Nov. 29, 1999, now U.S. Pat. No. 6,553,387, and "Volume Migration Between Volume Groups"—Ser. No. 09/451,220, filed Nov. 29, 1999.

FIELD OF THE INVENTION

This invention relates generally to data storage, and more particularly to providing an administrator for logical volumes within a storage network.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1999, Microsoft Corporation, All Rights Reserved.

BACKGROUND OF THE INVENTION

As computer systems have evolved so has the availability and configuration of data storage devices, such as magnetic or optical disks. For example, these storage devices can be connected to the computer system via a bus, or they can be connected to the computer system via a wired or wireless network. In addition, the storage devices can be separate or co-located in a single cabinet.

A storage volume is a software abstraction of the underlying storage devices and is the smallest self-contained unit of storage mounted by an operating system and administered by a file system. Storage volumes abstract the physical topology of the storage devices and may be a fraction of a disk, a whole disk or even multiple disks that are bound into a virtually contiguous range of logical blocks. This binding may increase the fault tolerance, performance, or capacity characteristics of the underlying storage devices.

One technique for improving fault tolerance, known as mirroring or plexing a disk, uses multiple disks. When data is written to one disk the data is also written to a second disk; thus the second disk is a "mirror image" of the first disk. If one disk should fail the second disk is still available for use and has an exact copy of the information on the first disk.

Volumes are constructed from one or more extents that are contiguous storage address spaces presented by the underlying storage devices. An extent is typically characterized by the size of the address space and a starting offset for the address space from a base of the media. Volume mapping is the process of mapping the contiguous address space presented by the volume onto the non-contiguous storage address spaces of the underlying extents. Volume mappings are either implemented on a specialized hardware controller, referred to as a hardware volume provider, or in software by a software volume provider.

Conventional volume providers are configured and managed with unique, vendor-specific tools. Each provider typically uses a proprietary protocol for communicating between the storage device and the driver. These unique applications make it difficult for an administrator to manage a system having multiple storage devices. For example, consider two RAID storage cabinets from different vendors that are combined to form a single, striped volume. A first vendor-specific volume management tool is often required to configure the disks within the first RAID cabinet while a completely different tool is required to configure the disks within the second cabinet. In addition, a third tool is required to combine the two storage cabinets to form a volume. Therefore, there is a need in the art for a mechanism for uniformly configuring and coordinating multiple volume providers.

SUMMARY OF THE INVENTION

The above-mentioned shortcomings, disadvantages and problems are addressed by the present invention. In one aspect, the invention is a storage management system in which a plurality of volume providers map logical storage volumes onto one or more storage devices of a storage network. A common volume manager executing on a computer within the storage network selectively communicates commands to one or more of the volume providers in order to control the storage devices. In this manner, the inventive storage management system seamlessly integrates management of multiple volume providers. The common volume manager provides a common application programming interface (API) by which applications are able to control and monitor hardware and software volume providers without requiring detailed knowledge of the volume providers or the underlying storage devices. The interface is extensible so as to support provider-specific storage management requests. In one aspect the interface conforms to a Component Object Model (COM) interface.

In another aspect, the invention is a method for managing the plurality of volume providers. According to the method, a storage management request is received from a software application. One or more commands are generated as a function of the received storage management request. The generated commands are then selectively communicated to one or more of the volume providers. In one aspect the method further includes aggregating response information from the volume providers and communicating the aggregated information to the software application that issued the storage management request.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that changes may be made without departing from the spirit or scope of the present invention. The following detailed description is, therefore, not to be taken in a limiting sense, and the scope of the present invention is defined only by the appended claims.

The detailed description is divided into six sections. In the first section, a glossary of terms is provided. In the second section, the hardware and the operating environment in conjunction with which embodiments of the invention may be practiced are described. In the third section, a system level overview of the invention is presented. In the fourth section, methods for an exemplary embodiment of the invention are provided. In the fifth section, an exemplary embodiment of the invention is provided. Finally, in the sixth section, a conclusion of the detailed description is provided.

DEFINITIONS

Compromised—a status indicating that a fault tolerant volume is missing one or more disk or volume extents; for example, a mirror set with only one mirror currently available.

Configuration data—describes the mapping of physical resources to logical volumes.

Directed configuration—a provider is explicitly furnished rules for choosing logical block remapping.

Disk platter—a subset of a diskpack, used for exporting or importing volumes from a diskpack.

Diskpack—a collection of logical volumes and underlying disks. A diskpack is the unit of transitive closure for a volume.

Export—Move a disk platter and all volumes contained on that platter out of one diskpack.

Mounted—a volume is mounted by an operating system when the volume has an associated volume name (drive letter or volume mount point). The volume can be made available to a file system or other data store.

Free agent drive—a disk drive which is not a member of a disk pack. Free agent drives cannot contain logical volumes that are mounted.

Health—volume fault management status. A volume may be initializing, healthy, compromised, unhealthy, or rebuilding.

Healthy—containing or being able to contain valid data.

Hot-spotting—temporary plexing of a volume or collection of volume extents.

Import—Move a disk platter and all volumes contained on that platter into one diskpack.

Initializing—a status indicating that a volume is rediscovering volume configuration.

LBN—logical block number.

Logical block mapping—relationship between the logical blocks exposed to the logical volume provider to those exposed by the same provider.

Logical volume provider—software which exposes logical volumes. A provider includes runtime services, configuration data, and management services.

Management service—software to perform volume configuration, monitoring or fault handling.

Mapped volume—a simple linearly logical block mapping which concatenates volumes to expose a single larger volume.

Mirrored volume—logical volume which maintains two or more identical data copies. Also termed RAID 1.

Parity striped volume—logical volume which maintains parity check information as well as data. The exact mapping and protection scheme is vendor-specific. Includes RAID 3, 4, 5, 6.

Plexed volume—a temporary mirror volume. Plexing is used to create a copy of a volume rather than to provide fault tolerance. The mirror is added to the volume with the intent of removal after the contents have been synchronized.

RAID—redundant array of independent disks.

Rebuilding—a status indicating that a previously compromised fault tolerant volume is resynchronizing all volume extent data.

Runtime service—software that executes on a per-IO request basis.

SCSI—Small-Computer Systems Interface.

Stacked volume—volume has been constructed by more than one logical block mapping operation. An example is a stripe set of mirror volumes. Stacking includes stripping, mapping, and plexing.

Striped volume—a logical block mapping which distributes contiguous logical volume extents across multiple volumes. Also termed RAID 0.

Unhealthy—a status indicating that a non-fault tolerant volume missing one or more disk or volume extents; data contained on unhealthy volumes must not be accessed.

Volume

Volume configuration stability—status to determine whether volume logical to physical mapping is undergoing change. A volume may be stable, extending, shrinking, plexing, or remapping.

Volume extent—a contiguous range of logical blocks contained on a volume. Volume extents are the smallest managed logical volume unit.

Volume status—current use of a volume by the system. A volume may be unused, mounted, in use, or unknown.

HARDWARE AND OPERATING ENVIROMENT

Figure 1:
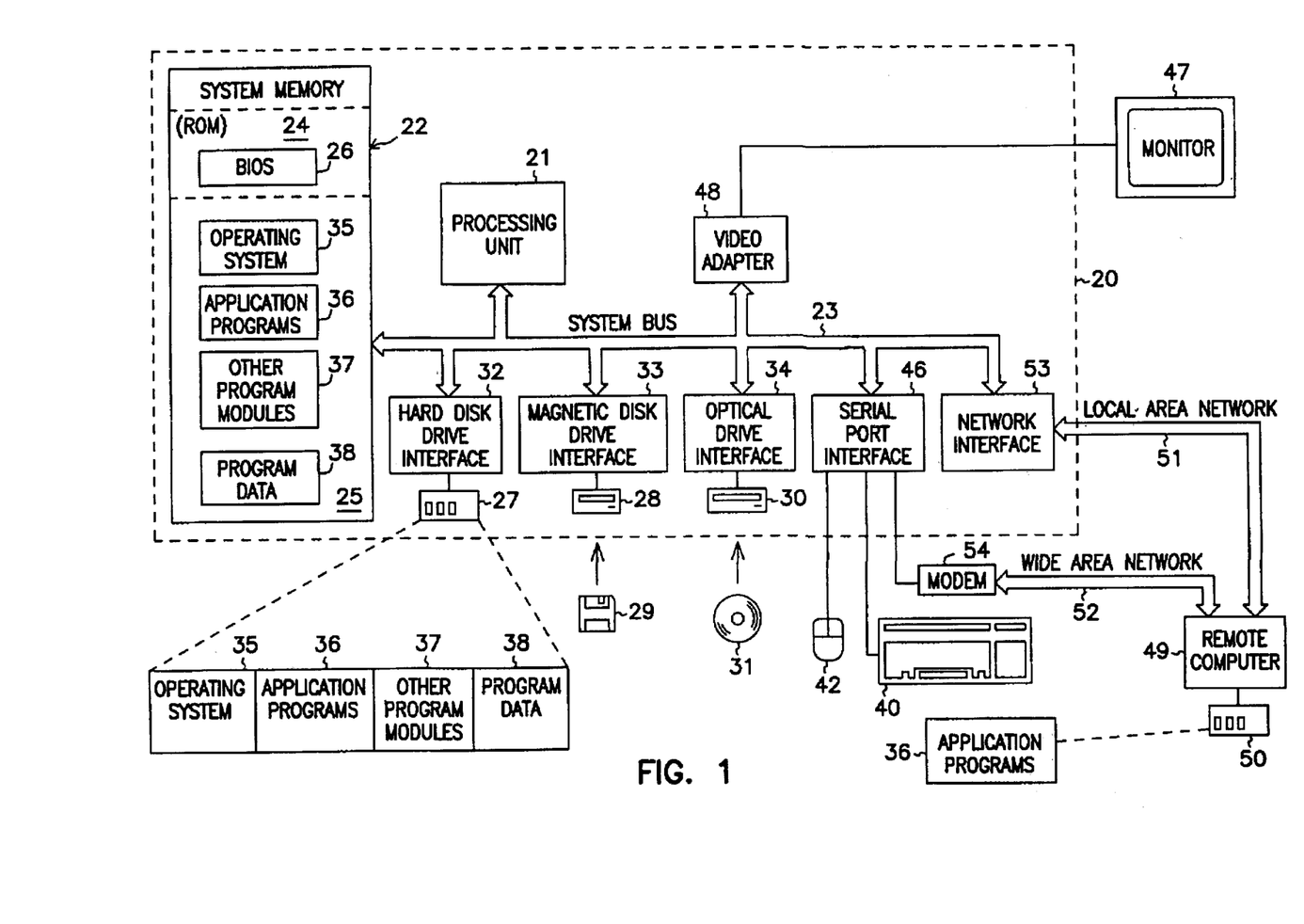
FIG. 1 shows a diagram of the hardware and operating environment in conjunction with which embodiments of the invention can be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, or a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk 27, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20, the local computer; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of, and communications devices for, establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Over

Figure 2:
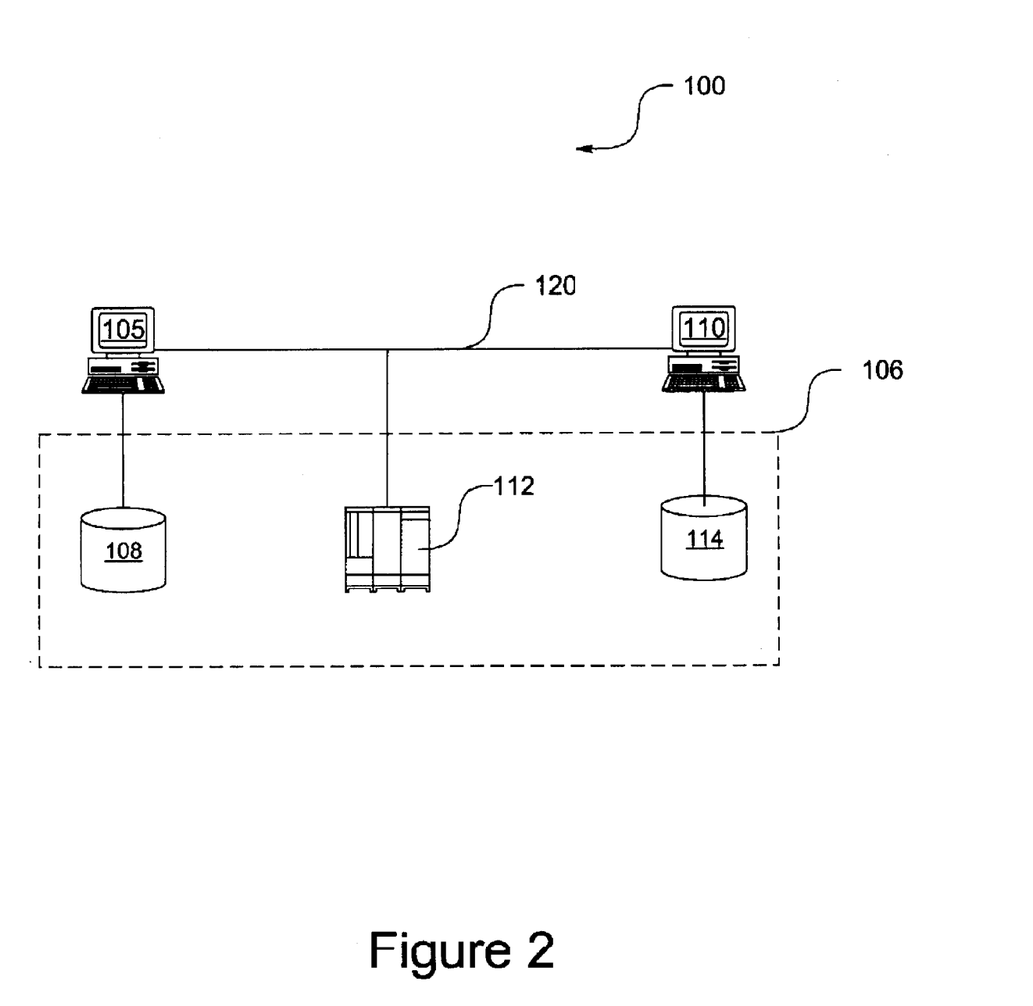
FIG. 2 is a block diagram illustrating a system-level overview of a storage network having two computing systems and a variety of storage devices.

FIG. 2 is a block diagram illustrating a system-level overview of storage network 100 that includes computer 105, computer 110 and storage devices 106 that are communicatively coupled via network 120. Computers 105 and 110 represent any suitable computing system such as local computer 20 or remote computer 49 in FIG. 1. Storage devices 106 include storage device 108, storage device 112, and storage device 114 that may be any suitable storage medium such as a single internal disk, multiple external disks or even a RAID cabinet.

Storage devices 108 and 114 are directly connected to computers 105 and 110, respectively while storage device 112 is directly connected to network 120 and, in the illustrated embodiment, is a RAID storage cabinet having multiple disks. Storage devices 106 have corresponding volume providers (not shown) to map logical storage volumes onto one or more storage devices 106 of storage network 100. These volume providers may be implemented in either software or hardware and may reside within the respective storage devices 108, 112 and 114 or within computers 105 and 110. As illustrated in detail below, the invention provides a seamless approach to managing the hardware and software volume providers of storage network 100.

Figure 3:
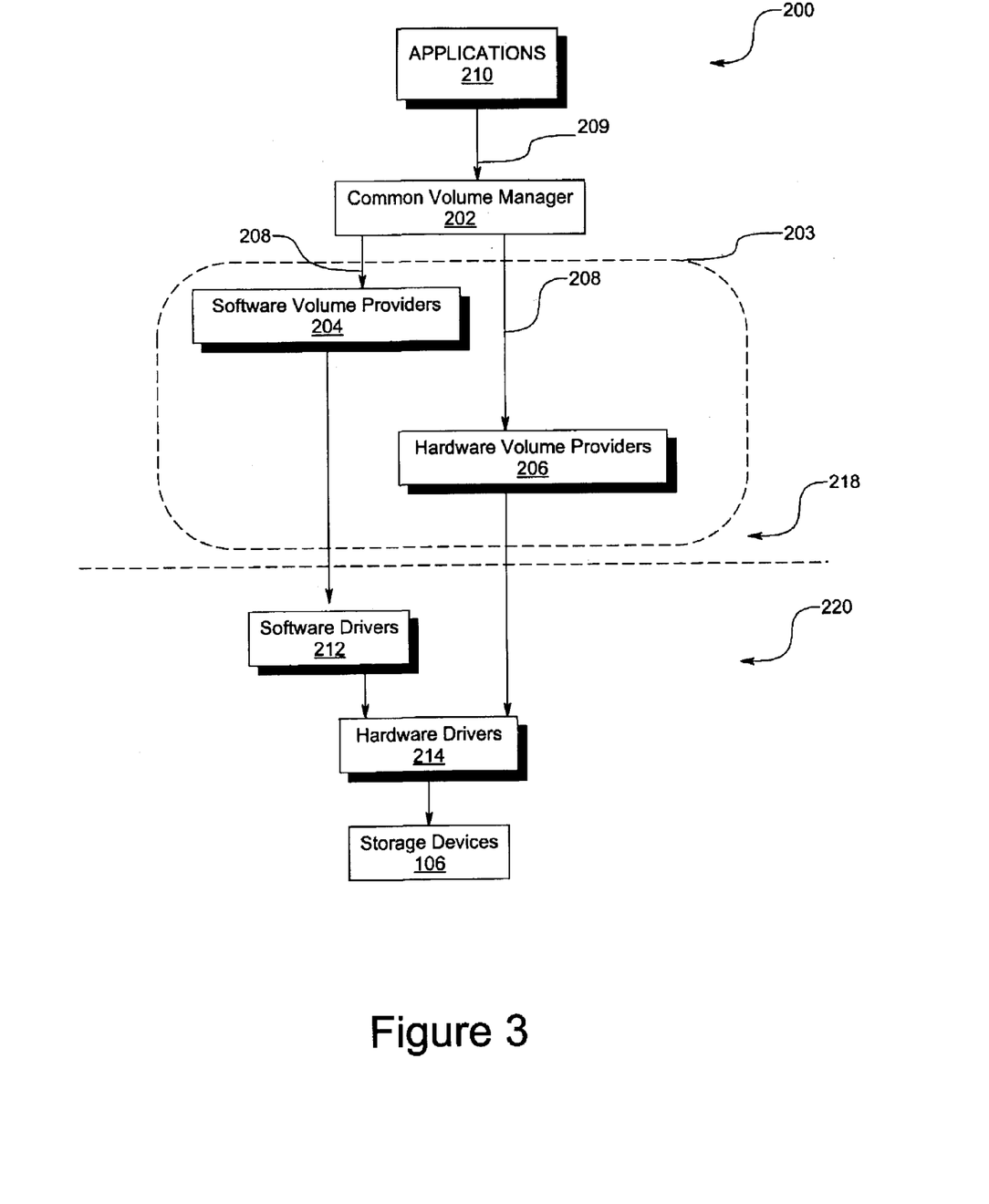
FIG. 3 is a block diagram illustrating one embodiment of a storage management system for uniformly managing software and hardware volume providers according to the invention.

FIG. 3 is a block diagram illustrating one embodiment of a storage management system 200 for managing various volume providers 203 of storage network 100 (FIG. 2). Storage management system 200 includes applications 210, common volume manager 202, and volume providers 203. Application 210 can be a management-type software application used by a system administrator to configure volumes or can be a user-type application that accesses the storage devices 106. As illustrated in FIG. 3, volume providers 203 consist of software volume providers 204 and hardware volume providers 206 that execute in user space 218. In other embodiments volume providers 203 execute in any combination of user space 218 and kernel space 220. Drivers 212 and 214 support run-time services that are provided by the operating system and execute in kernel space 220.

Common volume manager 202 integrates software providers 204 and hardware providers 206 in order to present a unified view for accessing and configuring storage devices 106. Common volume manager 202 receives volume management requests from applications 210 and issues commands to volume providers 203 accordingly. In so doing, common volume manager 202 enforces storage policies to ensure uniformity across providers 203 and provides high-level service routines for storage network 100. Examples include: (1) performing a data flush on a node of storage network 100 prior to breaking a mirror plex, (2) deciding whether to unbind a logical volume that spans multiple storage devices 106, (3) using the underlying characteristics of the storage devices 106 to allocate mirror copies of a volume based on pairs of devices that have similar seek and data-rate characteristics, (4) relocating volumes to a more appropriate storage device 106, (6) only allowing storage devices having similar characteristics to be striped, and (7) performing all security authentication and authorization. When a new storage device is added to storage network 100 its storage characteristics are analyzed, compared with the existing storage devices 106 and the new storage device is utilized accordingly. For example, if the new storage device supports mirrored volumes and has a seek and latency better than those of an existing pair of devices that currently implement a mirrored volume then common volume manager 202 can move the mirrored volume from the two storage devices 106 to the new storage device.

Volume providers 203 receive the commands from volume manager 202 and perform a variety of management tasks in response such as volume configuration, performance monitoring and asynchronous event handling. Volume providers 203 may include vendorspecific rules to optimize binding configurations, monitor and dynamically tune performance, automatically handle faults, or any other vendor-specific added functionality. In addition, volume providers 203 expose configuration data that identifies the physical resources comprising the logical volumes of storage network 100.

In order to integrate volume providers 203, common volume manager 202 presents an Application Programming Interface ("API") 209 that provides a set of functions, or interfaces, by which applications 210, such as administrative tools, are able to manage volume providers 203 without having detailed knowledge of the volume providers 203 or the underlying storage devices 106. For example, applications 210 need not be aware of the underlying policies, physical characteristics, etc., of each volume provider 203. Applications need not know whether the provider 203 is a software provider 204 or a hardware provider 206. The invention allows applications 210 to monitor and track how I/O requests are distributed throughout storage devices 106 without individually examining each storage device 106. For example, even though storage devices 106 may be running different platforms and may be manufactured by different vendors, an application 210 is able to identify an overloaded storage device 106 and load balance across storage devices 106 via common volume manager 202.

Common volume manager 202 requires that each volume provider 203 conform to interface 208. Interface 208 supports a group of primitives that describe the configurations for the various storage devices 106 of storage network 100 such as a number of disks and their organization. At a minimum, volume providers 203 convert the functions of interface 208 to industry standard or vendor-specific protocol requests to the controller. In addition, interface 208 allows storage devices 106 to pass a variety of performance information to applications 210. As devices are added to storage devices 106, new volume providers 203 can be easily integrated into storage management system 200. In one embodiment, interface 208 and API 209 are implemented using Component Object Model (COM).

Each volume provider 203 within storage management system 200 has a corresponding hardware driver 214. In addition, a software volume provider 204 may interface with a corresponding software driver 212 or may may utilize a hardware volume provider 206 via common volume manager 202. Drivers 212 and 214 handle all communications with storage devices 106 and may implement one of a variety of protocols such as SCSI ("Small-Computer Systems Interface"), IP ("Internet Protocol"), etc.

Although the volume providers 203 must conform to interface 208, the invention places no restraints on how the volume providers 203 communicate with the software drivers 212 or hardware drivers 214 and can use any desired protocol. In this fashion, storage management system 200 requires no changes to conventional drivers 212 and 214. Thus, vendors of storage devices 106 are free to develop their own communication protocols.

In order to facilitate uniform communication to the various providers 203, common volume manager 202 identifies each logical volume, each storage device 106 and each volume provider 203 with a Globally Unique Identifier (GUID). In addition, API 209 provides abstracted volume types and defines default, wildcard, and error values. The following list illustrates one embodiment of abstracted volume types: Default, FaultTolerant, NotFaultTolerant, Simple, Span, Stripe, Mirror, Parity, Plex.

API 209 is extensible in the sense that volume providers 203 supports provider-specific extension for exposing provider-specific configuration attributes and parameters. Applications 210 that use these provider-specific extensions are responsible for interpreting these extensions and are assumed to have knowledge of their meaning. In one embodiment, each exposed attribute consists of a short name, a longer descriptive text and a current value. This embodiment allows applications 210 to generically accommodate arbitrary provider extensions.

Volume configuration and query operations invoked by applications 210 may take considerable time for processing by providers 203. As such, common volume manager 202 allows all functions of API 209 to be invoked asynchronously. Applications 210 provide a callback routine and parameter in order to handle the asynchronous event that is issued when the request has been processed. In one embodiment, applications 210 and common volume manager 202 handle the asynchronous events via a COM interface.

The system level overview of the operation of an exemplary embodiment of the invention has been described in this section of the detailed description. As described, the inventive volume management system presents a common view for accessing and configuring software providers and hardware volume providers.

MethosS of an Exemplary Embodiment of the Invention

In the previous section, a system level overview of the operation of an exemplary embodiment of the invention was described. In this section, the particular methods performed by a computer executing an exemplary embodiment are described by reference to a flowchart. The methods to be performed by a computer constitute computer programs made up of computer-executable instructions. Describing the methods by reference to a flowchart enables one skilled in the art to develop such programs including such instructions to carry out the methods on suitable computers (the processor of the computers executing the instructions from computer-readable media).

Figure 4:
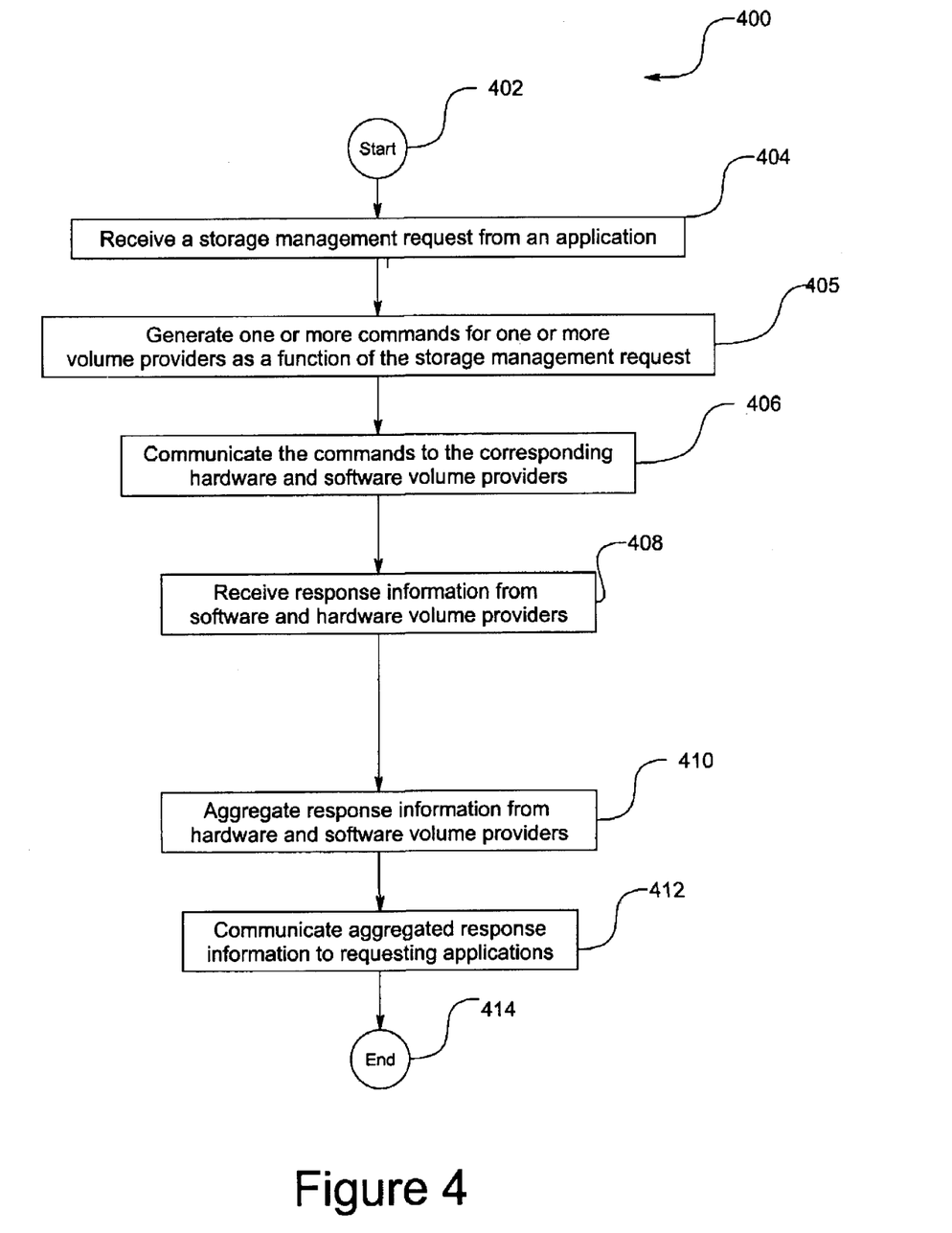
FIG. 4 is a flowchart illustrating one mode of operation of the inventive storage management system.

FIG. 4 is a flowchart 400 illustrating one exemplary method of operation of common volume manager 202 (FIG. 3) for managing various volume providers of storage network 100 (FIG. 2). Common volume manager 202 begins flowchart 400 with block 402 and proceeds to block 404. In block 404, common volume manager 202 receives a storage management request from an application 210 via API 209 as discussed in detail above.

In block 405 common volume manager 202 generates one or more commands necessary to execute the storage management request. In block 406, common volume manager 202 issues the commands to appropriate volume providers 203. If a command requires action by more than one provider 203 then common volume manager 202 communicates the command to all of the necessary providers 203. The volume providers 203 communicate the commands to storage devices 106 for processing. If, however, volume providers 203 are able to respond to the commands without assistance then volume providers 203 need not communicate the commands to the underlying storage devices 106 and can process the commands locally.

After processing the commands, in block 408 the volume providers 203 communicate response information to common volume manager 202. This response information can indicate whether the command was successful, it can contain current configuration information, or it can contain a variety of status information such as current loading and performance. In block 410 the common volume manager 202 aggregates related information. For example, in many cases common volume manager 202 issues commands to two or more volume providers 203. When these commands are completed, common volume manager 202 aggregates the response information in order to communicate a uniform response to the requesting application 210 in block 412.

Step 414 represents the completion of a single cycle in which an application 210 issues a storage request and receives resulting response information. As discussed above, because certain functions of interface 208 may require substantial processing time, interface 208 presented by common volume manager 202 also supports asynchronous event handling for receiving the response information.

An Exemlary of the API Provided by the Common Volume Manger

This section describes in detail one embodiment of API 209 (FIG. 3) provided by common volume management 202. The functions presented by API 209 generally fall within three categories:

1. Configuration operations that guide logical volume creation, deletion, modification, and migration between systems;
2. Topology and state queries that allow discovery of the current configuration including the physical disks which comprise a given volume, the type of volume and volume status such as recovering after disk failure.
3. Maintenance and monitoring operations for fault management, performance monitoring, and common site maintenance.

Listed below is one embodiment of specific functions supported by common volume manager 202 and accessible through API 209:

QueryLvmParameters—returns vendor-specific parameters that identify the providers 203, the underlying volume type and information regarding vendor extensions.

CancelVolumeOperation—cancels any previous issued asynchronous volume configuration operation or configuration query.

CompleteVolumeOperation—waits for the completion of a previously issued asynchronous volume configuration operation or configuration query.

BindVolume—creates and initially configures a volume.

UnbindVolume—Deletes and deconfigures the volume. All data is lost. All disk extents that contributed to the volume are freed for immediate reuse by the volume provider 203. The common volume manager 202 performs any coordination with the operating system prior to passing this request to the volume provider 203.

StripeVolume—Creates and configures a striped logical volume using extents from the specified logical volumes or disks. Stripe sets are constructed from equal length extents; equal size extents from each target (volume or disk) in the allocation array are consumed.

UnstripeVolume—Deletes and deconfigures the stripe set volume. All data is lost. All volume or disk extents that contributed to the volume are freed for immediate reuse by the stacking volume provider. Common volume manager 202 performs any coordination with the operating system prior to passing this request to the volume provider.

MapVolume—Configures a mapped volume. Volume extents are allocated in the order specified by the allocation array and concatenated. The resulting mapped volume is mounted by the operating system and a drive letter or mount point is assigned.

UnmapVolume—Deletes and deconfigures the mapped volume. This also removes the volume from use by the operating system and any associated disk number is deleted. Common volume manager 202 performs any coordination with the operating system prior to passing this request to the volume provider 203.

ExtendVolume—Grows the specified volume. The mechanism depends on the type of volume being extended. Simple spanned or mapped volumes are extended by appending volume extents. Striped volumes are extended by growing each contributing automagic volume. Plexed volumes are extended by growing each plex.

ShrinkVolume—Removes volume extents from the specified volume. Striped volumes are contracted by shrinking each contributing volume.

AddPlex—Adds a plex to the specified volume. The completion routine is invoked after the added plex has been synchronized with the original volume.

RemovePlex—Removes a previously added plex from the specified volume. Common volume manager 202 optionally synchronizes the file system prior to causing the plex to be broken. After removal, the plex is no longer held in synchronization with the original volume.

CreatePack—Creates a diskpack. The extent size must be a power of two disk sectors. If the extent size is not specified, common volume manager 202 will use 1% of the largest disk drive known to be in the configuration. For example, the extent size would default to 128 MB for configurations with 18 GB drives.

DeletePack—Deletes a diskpack.

AddDisksToPack—Adds disks to a pack. Any logical volume originally on the added disks is lost and not imported to the pack.

EvacuateDisks—This routine moves any volume extents from the disk array to other disks in the diskpack. Note that to be eligible for removal, any volumes occupying a disk must have been evacuated. In other words, the disk must contain no live data. The disks remain evacuated until explicitly declared ready for inhabit or hot spare.

FreeDisksFromPack—Removes disks from pack and makes them free agents. Note that to be eligible for removal, any volumes occupying a disk must have been evacuated. In other words, the disk must contain no live data.

ReplaceDisk—Substitutes one physical disk for another to allow media migration. Any contents of the replaced disk are migrated, although not necessarily to the new disk. At completion, the replaced disk is no longer in use and may be physically removed.

InhabitDisks—Declares the disks available for volume migration or other volume configuration operation.

ImportPlatter—Imports all volumes and adds all disks contained on the platter to the pack. This operation may fail or cause reconfiguration of the existing volumes if the volume allocation extent of the platter differs from that of the receivirig platter. If one or more disks have been lost in the movement, volumes contained on the platter may not be transitively closed. The imported volumes join all other volumes in the pack.

ExportPlatter—Marks all disks on the platter ready for export. As a side effect, the disks contained in the platter are recorded such that when the platter is subsequently imported, the receiving pack can determine if all disks are present.

MigratePlatter—Atomically moves the platter between packs. Both packs must be present on the same processor node in a cluster.

MoveVolumesToPlatter—Prepares a platter for migration by moving one or more volumes to one or more disks.

MoveVolumesFromPlatter—Explicitly moves volumes or evacuates disks and frees them from a platter.

ForgetPlatter—Cancels preparation of a platter for volume migration. Any volumes on the platter rejoin the disk pack and may migrate freely.

In addition to the above-listed functions, API 209 supports many queries that allow an application 210 to determine logical volume configuration including determination of the underlying physical resources of a volume provider.

QueryDisks—Returns all disks with the option of grouping or filtering by provider and/or pack.

QueryVolumes—Returns all volumes with optional "scoping" (grouping) by a specified criteria such as by provider, pack or type.

QueryVolumeExtents—Returns all volumes contributing one or more extents to this volume. Only one level of the stacking hierarchy is traversed; the query must be made at each stacking level to build up a complete view.

QueryVolumeDiskExtents—Returns all disk extents contributing to the volume, regardless of the stacking hierarchy. This routine provides a simple physical view of the resources consumed by the volume.

QueryVolumesUsingDisk—Finds all volumes with extents residing on the specified disk.

QueryVolumesUsingVolume—Finds all stacked volumes with extents residing on the specified volume.

QueryVolumeMount—Returns the operating system disk number or mount point for a mapped volume.

OueryVolumeDeviceObiect—Returns the lowest level logical identifiers for a disk or hardware RAID volume.

OueryVolumePlexes—Finds all plexes of the specified volume. The returned volume array contains plexes in plexld order.

OueryVolumesUsingPlex—Finds the base volume given a plex. The returned plexld is that of the original plex volume.

QueryPacks—Returns all diskpacks.

QueryPlatters—Returns all disk platters with optional scoping by pack.

QueryPackofPlatter—Returns the diskpack containing the specified platter.

QueryPlatterVolumes—Returns all volumes contained on the specified platter.

QueryVolumePack—Returns the pack that contains the volume.

QueryVolumePlatter—Returns the platter (if any) and pack which contains the volume. If the volume is not on a platter, the platter is returned as NO_PLATTER.

OueryPlatterDisks—Returns the disks (if any) contained on the platter.

QueryDiskPack—Returns the diskpack containing the disk. If the disk is a free agent, the returned pack is NO PACK.

OueryDiskPlatter—Returns the platter (if any) and pack which contains the disk. If the disk is not on a platter, the returned id is NO_PLATTER. If the disk is a free agent, the returned pack is NO_PACK.

In addition, API 209 supports additional queries regarding the status of a logical volume maintained by providers 203 including the following attributes: Access by OS (VOLUME_STATUS), fault recovery status (VOLUME_HEALTH), configuration stability (VOLUME_JELLO), disk pack membership (VOLUME_PACK), whether or not the volume is plexed, whether or not the volume logical mapping is fixed or dynamic, relative rebuild priority (high-low).

OueryVolumeAttributes—Returns volume type, provider, pack, size, and attributes.

QueryVolumeSize—Returns volume size.

QueryVolumeType—Returns volume type.

QueryVolumeStatus—Returns volume status.

OueryVolumeProvider—Returns volume provider.

QueryVolumeLbnRemap—Returns whether or not the volume may currently be dynamically reconfigured.

OueryVolumeUsingStatus—Returns all volumes with specified status with optional scoping by provider and/or pack and/or type.

OueryVolumeUsingHealth—Returns all volumes with specified health with optional scoping by provider and/or pack and/or type.

ForceVolumeHealthy—Forces volume to be healthy. Allows possibly dangerous override in the event of catastrophic disk failures.

ForceVolumeInitialize—Forces volume to be reinitialized. All data may be lost. Allows possibly dangerous override in the event of catastrophic disk failures.

ForceVolumeRebuild—Forces volume to be rebuilt. Allows possibly dangerous override in the event of catastrophic disk failures.

SetVolumeLbnRemap—Enables or disables remapping by the logical volume provider. Disabling remapping freezes the current logical to physical topology of the volume.

SetVolumeRebuildPriority—Sets the relative rebuild priority for the volume.

SetVolumeName—Renames the volume.

SetVolumeExtensions—Sets provider-specific extended attributes for the volume.

QueryDiskSize—Returns size in bytes of the specified disk.

QueryDiskConnection—Returns abstracted physical connection to disk.

QueryDiskProvider—Returns lowest level provider managing the disk.

QueryDiskStatus—Returns current access by the operating system.

SetDiskHotSpare—Declares disk to be used as a "hot" spare. If the disk current contributes to one or more logical volumes, this call will fail. The volumes must be first moved using ReplaceDisk.

QueryProviders—Returns all active logical volume providers.

QueryVolumeProviderName—Returns the name of the specified logical volume provider.

In addition, API 209 also provides routines that export an abstract view of the physical topology and hardware resources of the storage devices 106. For example, API 209 reveals the current condition of a hardware controller and the parameters affecting volumes configured using that controller are described by controller attributes including:

Current controller in active use and path to that controller.

Battery backup support.

Physical topology underlying the controller such as the number of disks and disk paths.

Controller capabilities such as logical block remapping, volume rebuild support.

Controller physical attributes such as cache size and firmware revision.

QueryVolumeController—Returns the provider, pack, and controller associated with the specified volume.

QueryDiskController—Returns the provider, pack (if any), and controller associated with the specified disk.

QueryControllerParameters—Returns the array of vendor-specific controller extended parameter values.

QueryControllerAttributes—Returns controller type, associated provider, any packs to which the controller contributes disks, whether the controller is currently online, controller health and attributes.

QueryControllerPath—Returns primary, secondary, and currently active paths for a dual pathed controller.

QueryControllerLbnRemap—Returns whether or not the controller is capable of dynamic volume reconfiguration and whether or not the controller is currently allowed to do so. If remapping is enabled, the provider can migrate volume extents at will.

ForceControllerHealthy—Forces controller to be healthy. Allows possibly dangerous override in the event of catastrophic controller or disk failures.

ForceControllerInitialize—Forces controller to reinitialize.

ForceControllerRebuild—Forces all volumes configured behind the controller to be rebuilt.

ForceControllerPath—Forces active controller path to specified path.

SetControllerExtensions—Sets provider-specific extended attributes for the controller.

QueryDiskParameters—Returns the array of vendor-specific disk extended parameter values.

QueryDiskAttributes—Returns associated provider, pack (if any), abstracted connection type, controller, size, status, and vendor-specific extensions for the specified disk.

QueryControllerDisks—Returns an array of disks attached to the specified controller. The array identifies each disk path and the disks per path.

Common volume manager 202 also provides two kinds of maintenance operations via API 209:

Simple target identification and sanity checks. These functions allow access to a subset of site maintenance operations such as flashing a light on a disk drive. Disk drives, controllers, or logical volumes can be targeted by these functions.

Detailed inquiries of the controller and disk hardware status, including setting hardware alarm thresholds. In one embodiment this model follows the SCSI-3 SES protocol that is known to one skilled in the art. These functions eliminate the need for detailed knowledge of the underlying vendor-specific protocol.

The common volume manager 202 translates simple maintenance operations targeting logical volumes to operations on each contributing disk. In all cases, specifying nonsensical operations or operations unsupported by the volume providers 203 will cause the operation to fail with no side effects.

StartMaintenance—Initiates specified hardware maintenance operation. The operation will repeat until stopped.

StopMaintenance—Stops or cancels specified hardware maintenance operation. This stops any repeated operations such as blinking a light.

PulseMaintenance—Repeats specified hardware maintenance operation a specified number of times.

QueryMaintenanceElements—Returns the supported maintenance targets and instances of each. The maintenance element type and number of each populate the returned element array.

SetMaintenanceControl—Requests maintenance control operations.

GetMaintenanceStatus—Requests return of maintenance status.

SetMaintenanceThreshold—Requests maintenance threshold change operations.

GetMaintenanceThreshold—Requests return of maintenance thresholds.

Common volume manager 202 exposes performance tuning and monitors to applications 210. Volume providers 203 must implement these functions, but there are only minimal requirements on that implementation. Volume providers 203 could implement a proprietary performance tuner and expose only the required performance tuning or monitoring. A volume provider could also choose to be transparent and expose all sorts of tuning knobs and lots of performance monitoring, but take no provider-specific actions. All performance tuning parameters are assumed to be provider-specific.

QueryPerformanceAttributes—Returns common and vendor-specific performance attribute arrays.

EnablePerformanceCounter—Enables specified performance counters.

DisablePerformanceCounter—Disables specified performance counters.

ClearPerformanceCounter—Clears (sets to zero) specified performance counters.

QueryPerformanceData—Returns current performance counter value array.

StartPerformanceMonitor—Start performance counters.

StopPerformanceMonitor—Stop performance counters.

CONCLUSION

Various embodiments of the inventive volume management system have been described that present a unified view for accessing software providers and hardware volume providers. Several advantages of the invention have been illustrated such as providing a common interface by which applications are able to control or monitor the volume providers without requiring detailed knowledge of the volume providers or the underlying storage devices. Therefore, it is intended that only the claims and equivalents thereof limit this invention.

We claim:

1. A storage management system comprising:
   a plurality of volume providers that map logical storage volumes onto one or more storage devices;
   the volume providers comprising both hardware volume providers and software volume providers; and
   a common volume manager executing on a computer a communication of commands to one or more of the hardware volume providers and the software volume providers in response to a storage management request whereby the common volume manager communicates one or more commands based on the storage management request to one or more of the volume providers in order to control the storage devices.

2. The storage management system of claim 1, wherein the storage devices are configured as a storage network.

3. The storage management system of claim 1, wherein the storage devices are co-located within the computer.

4. The storage management system of claim 1, wherein the common volume manager generates the commands as a function of a received storage management request.

5. The storage management system of claim 1, wherein the common volume manager provides an application programming interface (API) for receiving storage management requests from software applications.

6. The storage management system of claim 5, wherein the common volume manager aggregates response information from the plurality of volume providers and communicates the aggregated information to the software applications.

7. The storage management system of claim 5, wherein the API is extensible to support provider-specific storage management requests.

8. The storage management system of claim 5, wherein the API conforms to a Component Object Model (COM) interface.

9. The storage management system of claim 5, wherein the common volume manager communicates with the volume providers using a Component Object Model (COM) interface.

10. A storage management system comprising:
    a plurality of volume providers to map logical storage volumes onto one or more storage devices, the volume providers being both hardware volume providers and software volume providers;
    a common volume manager executing on a computer and managing both hardware volume providers and software volume providers, wherein the common volume manager selectively communicates commands to one or more of the volume providers in order to control the storage devices, wherein the common volume manager generates the commands as a function of a received storage management request; and
    an administrative tool executing on a computer within the storage network, wherein the administrative tool issues the storage management request to the common volume manager in response to input from an administrator.

11. A method for managing of a hardware volume provider and a software volume provider comprising:
    receiving from a software application a storage management request in a common volume manager managing both the hardware volume provider and the software provider;
    generating in the common volume manager one or more commands as a function of the received storage management request; and
    communicating the generated commands from the common volume manager to one or more of the hardware volume provider and the software volume provider that map logical storage volumes onto one or more storage devices.

12. The method of claim 11, wherein the storage devices are configured as a storage network.

13. The method of claim 11, wherein the storage devices are co-located within the computer.

14. The method of claim 11, wherein receiving the storage management request includes receiving the requests via an application programming interface (API).

15. The method of claim 11, wherein receiving the storage management request includes receiving the requests via an application programming interface (API) that supports provider-specific storage management requests.

16. The method of claim 11, wherein receiving the storage management request includes
    receiving a storage management request from a software application via an application programming interface (API) that conforms to a Component Object Model (COM) interface.

17. The method of claim 11, wherein communicating the generated commands includes
    communicating the generated commands via a Component Object Model (COM) interface to one or more of the hardware volume provider and the software volume provder.

18. The method of claim 11, and further including:
    aggregating response information from the plurality of volume providers; and
    communicating the aggregated information to the software application.

19. A computer-readable medium having computer-executable instructions to cause a computer to perform the method of:
    receiving from a software application a storage management request in a common volume manager managing a hardware volume provider and a software volume provider;
    generating one or more commands as a function of the received storage management request; and
    selectively communicating the generated commands from the common volume manager through shared interface to one or more of the hardware volume provider and the software volume provider that map logical storage volumes onto one or more storage devices, both volume providers conforming to the shared interface.

20. The computer-readable medium of claim 19, wherein the storage devices are configured as a storage network.

21. The computer-readable medium of claim 19, wherein the storage devices are co-located within the computer.

22. The computer-readable medium of claim 19, further including computer-executable instructions to cause a computer to further perform the method:

aggregating response information from both volume providers; and communicating the aggregated information to the software application.

23. A set of application program interfaces embodied on a computer-readable medium for execution on a computer in conjunction with a software application, comprising:

a first plurality of interfaces of a common volume manager to receive configuration operations from the software application for configuring a plurality of hardware and software volume providers managed by the common volume manager;

a second plurality of interfaces of the common volume manager to receive queries from the software application and to return state and topology information regarding storage devices controlled by the plurality of hardware and software volume providers; and a third plurality of interfaces of the common volume manager to receive monitoring operations from the software application to monitor performance of the storage devices controlled by the plurality of the hardware and software volume providers;

wherein the common volume manager and the plurality of the hardware and software volume providers conform to a shared interface.

24. A storage management system comprising:

a plurality of hardware volume providers and software volume providers that map logical storage volumes onto one or more storage devices, each of the plurality of volume providers conforming to a shared interface; and a common volume manager executing on a computer and managing both the hardware volume providers and the software volume providers, wherein the common volume manager receives a storage management request, conforms to the shared interface and selectively communicates one or more commands generated as function of the storage management request through the shared interface to one or more of the hardware volume providers and software volume providers in order to control the storage devices.

25. A method for managing a plurality of hardware and software volume providers comprising:

receiving a storage management request in a common volume manager managing the hardware and software volume providers;

generating one or more commands as a function of the received storage management request; and selectively communicating the generated commands through a shared interface to one or more of the plurality of hardware and software volume providers that map logical storage volumes onto one or more storage devices, the plurality of hardware and software volume providers conforming to the shared interface.

26. A computer-readable medium having computer-executable instructions to cause a computer to perform the method of:

receiving a storage management request in a common volume manager managing hardware and software volume providers;

generating one or more commands as a function of the received storage management request; and selectively communicating the generated commands to one or more of the hardware and software volume providers that map logical storage volumes onto one or more storage devices.

27. A set of application program interfaces embodied on a computer-readable medium for execution on a computer in conjunction with a software application, comprising:

a first plurality of interfaces of a common volume manager to receive configuration operations from the software application for configuring a hardware volume provider and a software volume provider;

a second plurality of interfaces of the common volume manager to receive queries from the software application and to return state and topology information regarding storage devices controlled by the hardware volume provider and the software volume provider; and a third plurality of interfaces of the common volume manager to receive monitoring operations from the software application to monitor performance of the storage devices controlled by the hardware volume provider and the software volume provider.

* * * * *

UNITED STATES PATENT AND TRADEMARK OFFICE
CERTIFICATE OF CORRECTION

PATENT NO.    : 6,681,310 B1
DATED         : January 20, 2004
INVENTOR(S)   : Kusters et al.

It is certified that error appears in the above-identified patent and that said Letters Patent is hereby corrected as shown below:

Column 4,
Line 34, delete "Volume"

Column 8,
Line 22, delete "may may" and replace with -- may --

Column 9,
Line 6, delete "MethosS" and replace with -- Methods --
Line 62, delete "Exemlary" and replace with -- Exemplary Embodiment --

Column 13,
Line 4, delete "SetVolumeRebuildPrioritv" and replace with
-- SetVolumeRebuildPriority --
Lines 43, 49, 51 and 66, delete "Ouery" and replace with -- Query --

Column 14,
Lines 4 and 33, delete "Ouery" an replace with -- Query --

Column 16,
Line 3, delete "managing of a hardware" and replace with -- managing a hardware --
Line 35, delete "claim 11, wherein" and replace with -- claim 11 wherein --
Line 41, delete "claim 11, and further" and replace with -- claim 11 and further --
Line 65, delete "claim 19, further" and replace with -- claim 19 further --

Signed and Sealed this

First Day of June, 2004

JON W. DUDAS
*Acting Director of the United States Patent and Trademark Office*